March 23, 1965     F. P. ADLER     3,174,807
PNEUMATIC AND GRAVITY HOPPER DISCHARGE ARRANGEMENT
Filed Nov. 1, 1962     3 Sheets-Sheet 1
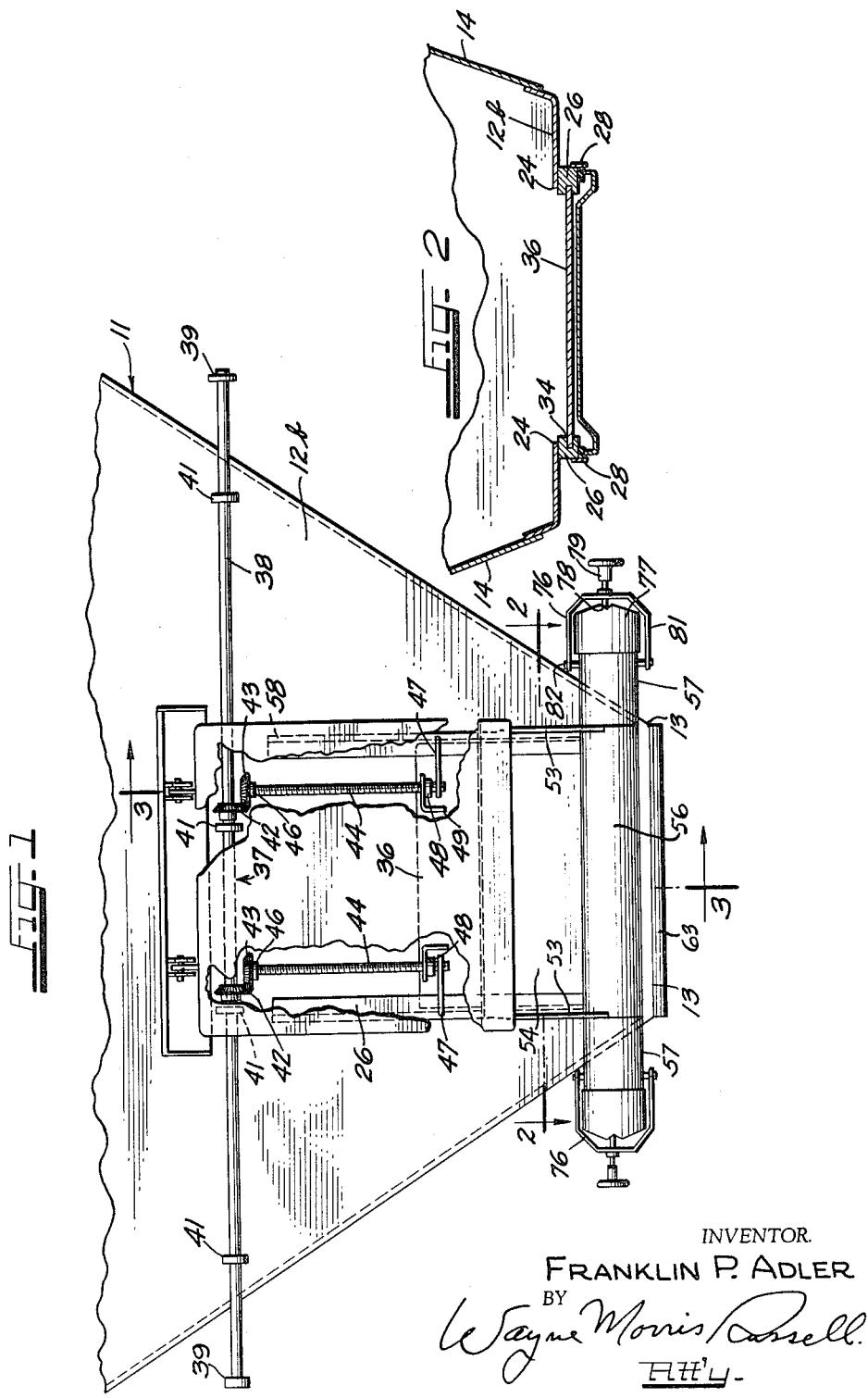
INVENTOR.
FRANKLIN P. ADLER
BY
Wayne Morris Russell
ATT'Y.

March 23, 1965   F. P. ADLER   3,174,807
PNEUMATIC AND GRAVITY HOPPER DISCHARGE ARRANGEMENT
Filed Nov. 1, 1962   3 Sheets-Sheet 2
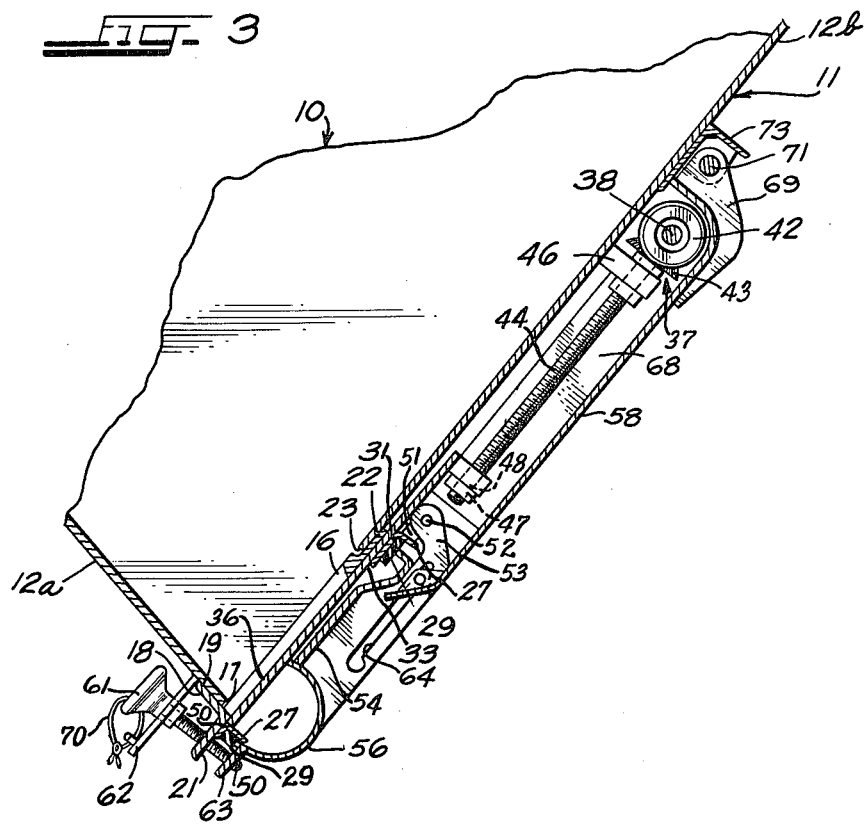
INVENTOR.
FRANKLIN P. ADLER
BY
Wayne Morris Russell

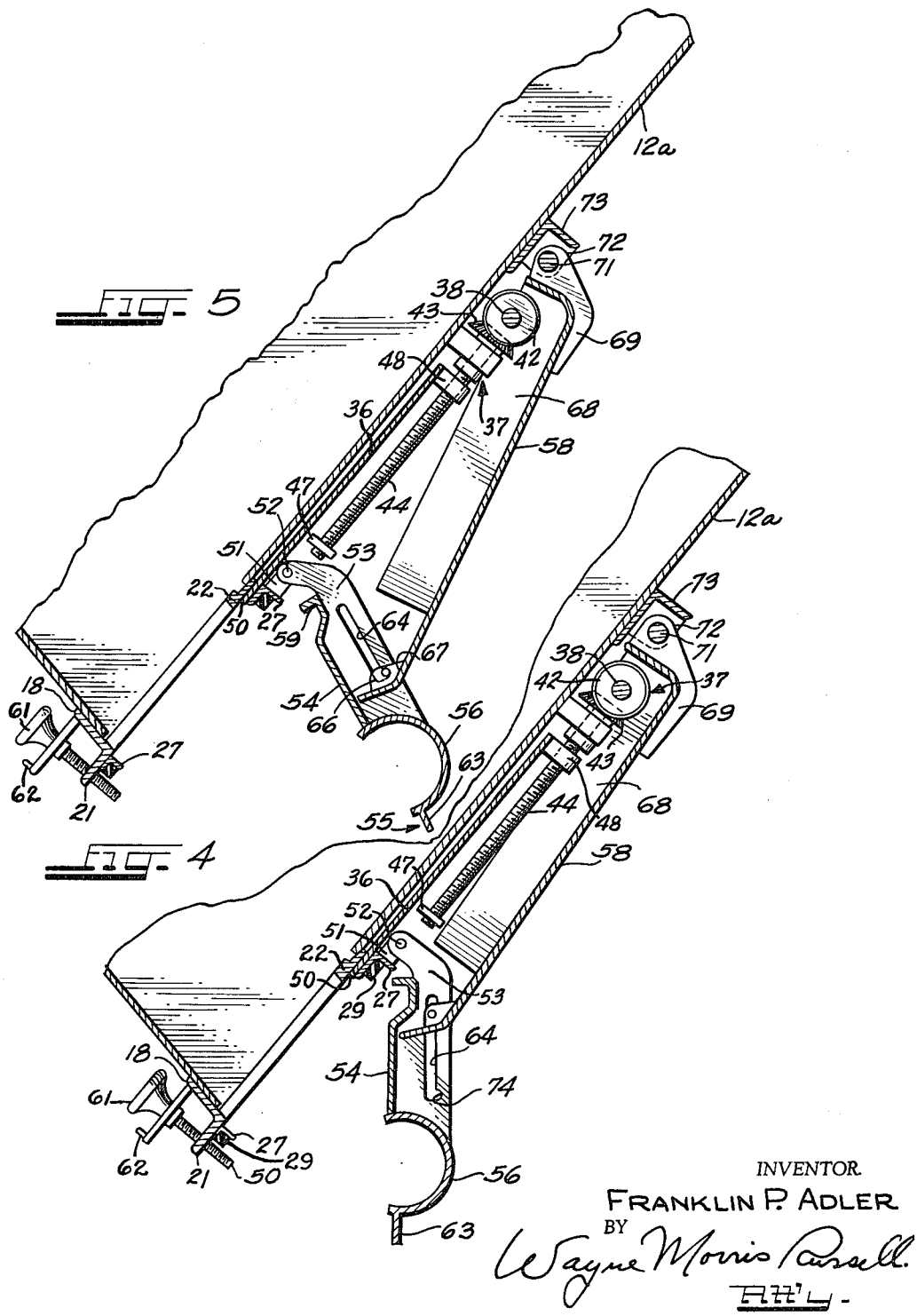

United States Patent Office 3,174,807
Patented Mar. 23, 1965

3,174,807
PNEUMATIC AND GRAVITY HOPPER DISCHARGE ARRANGEMENT
Franklin P. Adler, Michigan City, Ind., assignor to Pullman Incorporated, Chicago, Ill., a corporation of Delaware
Filed Nov. 1, 1962, Ser. No. 234,730
8 Claims. (Cl. 302—52)

The present invention relates to hoppers employed in covered hopper cars for transporting pulverulent materials and, more particularly, to a new and improved material discharge arrangement incorporating a combined gravity and pneumatic discharge structure for unloading the material from the hopper.

It is an object of the present invention to provide a hopper with a combined pneumatic and gravity discharge arrangement incorporating a pneumatic discharge structure which is optionally positionable between an operative position for discharging the pulverulent material therefrom and an inoperative position for permitting discharging of the material by gravity and also incorporating a gravity discharge structure which is constructed so as to control the rate of flow of the material into the pneumatic discharge structure when the latter is in the operative position and also to control the rate of gravity discharge when the pneumatic discharge structure is in the inoperative position.

It is a further object to provide a hopper discharge arrangement incorporating a pneumatic discharge structure wherein the structure is readily accessible for cleaning.

It is still a further object to provide a combined pneumatic and gravity discharge structure constructed and arranged so that ready access is available to the operating mechanical components thereof to facilitate adjustment and repair if necessary.

Further objects and features will hereinafter appear.

In the drawings:
FIG. 1 is a fragmentary lateral view of the discharge portion of a hopper incorporating the combined pneumatic and gravity discharge arrangement of the present invention.
FIG. 2 is a cross-sectional view taken generally along the lines 2—2 of FIG. 1.
FIG. 3 is a cross-sectional view taken substantially along the lines 3—3 of FIG. 1 showing the pneumatic discharge structure in its operative position for unloading the material from the hopper by pneumatic means.
FIG. 4 is a view similar to FIG. 3 but showing the pneumatic discharge structure in its operative position wherein the material may be discharged from the hopper by gravity.

Referring now to the figures there is illustrated the lower discharge portion 10 of the hopper 11 of type which is incorporated into a railway vehicle of the covered hopper car type. Such covered hopper cars conventionally include a plurality of lengthwise spaced hoppers formed between the vertical side walls and transversely separated by laterally extending end walls. As shown, each of the hoppers includes a hopper discharge portion 10 formed by converging wall or floor sheets 12a and 12b extending from the opposite end walls of the hopper and form a nadir 13. Sloping inwardly from the side sheets are wall or slope sheets 14 which enclose the ends of the substantially V-shaped trough formed by the floor sheets 12a and 12b so as to form a housing.

A substantially rectangular opening 16 is formed in one of the floor sheets 12b adjacent the nadir 13 so that the terminal edge 17 of the other floor sheet 12a forms one side thereof. An angle member 18 having a leg 19 is fixed along the floor sheet 12a adjacent the terminal edge 17 so that its other leg 21 projects outwardly from the floor sheet 12a and lies in a plane substantially parallel to and spaced slightly outwardly of the floor sheet 12b. A plate 22 is fixed along the opposite edge 23 of the opening 16 on the floor sheet 12b. Fastened to the floor plate 22 adjacent the edges 24 are grooved guiding bars 26. Fixed to the angle leg 21 is a rim member 27 of which a similar member is fixed across the guide bars 26 overlying the plate 22 in spaced relation. Rims 28 are fixed along the outer side of the guide bars 26. Adhered to the guide bars 26 and the rims 27 is a sealing gasket 29. As shown the upper member 27 is fixed across the guide bar members 26 so that its horizontal leg 31 is spaced outwardly of the top face of the plate 22 so as to provide a slot 33.

Slidably disposed in the slot 33 and the grooves 32 of the guide bars 26 is a gate 36 which may be formed from sheet steel or the like. The gate 36 is movable between a closed position closing the opening 16 as shown in FIG. 3 to a position in which the gate 36 is clear of the opening 16 as shown in FIG. 5 so that the material may flow therethrough under the influence of gravity. The gate 36 may, of course, be positioned anywhere intermediate the edges 17 and 23 to control the rate of flow of material therethrough.

For moving the gate 36 there is provided an actuating mechanism 37 including a drive shaft 38 turnably mounted on the floor sheet 12a and extending transversely of the car so that the ends thereof having a socket 39 for receiving a wrench or the like are accessible from the sides of the car. The drive shaft 38 may be suitably journaled on bracket arms 41 fixed to the floor sheet 12b. Fixed to the drive shaft 38 for turning movement therewith are transversely spaced bevel gears 42 which mesh with respective ones of bevel gears 43 fixed for turning movement to one end of screws 44. The screws 44 each are journaled at one end in journal brackets 46 projecting from the floor sheet 12 and at their other ends to journal bracket arms 47 fixed on the guide bars 26. Threaded on the screws are screw blocks 48 fixed along the upper end of the gate via angle straps 49.

Hence, upon turning of the drive shaft 38 in one direction, the bevel gears fixed thereon and meshing with the bevel gears 43 fixed to screw members 44 turn the latter to raise the leading edge 50 of the gate 36 away from its abutting positions against the lower rim 27 and thereby open the gate 36 to permit material to fall therethrough under the influence of gravity. The gate 36 may be raised relative to the rim 27 of the opening 36 to achieve the desired discharge flow. To close the opening the drive shaft 38 is turned in the opposite direction until the leading edge 50 thereof abuts the rim 27.

Extending upwardly from the vertical flange of the upper rim 27 of the opening are spaced hinge brackets 51 to which are pivotally fastened by means of pivot pins 52 and hinge leaves 53 projecting from a pneumatic discharge cover plate 54 of the pneumatic discharge arrangement 55. The pneumatic discharge arrangement 55 includes a pneumatic discharge cover 54 having a trough 56 in the form of a segment of cylinder formed along one end thereof. The trough 56 is axially aligned with opposing cylinders 57 fixed to the slope sheets 14. Associated with the pneumatic cover plate 54 is a protective housing 58 which serves to protect the gate driving mechanism 37.

The pneumatic discharge cover plate 54 may be formed of suitable sheet material to which there is fixed as by welding a trough 56 in the form of a segment of a cylinder along the lower edge thereof. The upper and side edges are formed to provide rims 59 which fit within the confines of the upstanding flanges of the respective top and side rims 27 and 28 of the opening 16 so as to firmly seat within the gaskets 29 secured to the latter. In this connection it is also to be noted that the unattached or free ends of the feed trough 56 in the closed position of the cover is formed so as to also seat in the gasket 29 fixed to the lower rim 27. In this manner the cover serves to form a substantially air-tight seal about the gate opening 16.

For holding and locking the cover plate 54 in its closed position, there is provided a hand operated bolt 61 which is turnably supported adjacent one end by a support plate 62 projecting from and suitably fixed to the leg 19 of the angle member 18 and adjacent its other is threadably supported by the leg 21. The end of the hand bolt 61 is threaded into a lip 63 projecting from the feed trough 54. Thus, to release the cover 54 the hand bolt 61 is turned out of threaded engagement with the lip 63 whereupon the cover 54 pivots about the pivot pins 52 to the position shown in FIG. 4.

A slot 64 is formed in each of the hinge leaves 54 fixed to the outer face of the cover 54. The slot 64 slidably accommodates a pin 66 fixed in a bracket 67 projecting from the underside of the protective housing 58. The protective housing 58 may be formed with end and side flanges to form an enclosure for the cover drive assembly 54. Cutouts are provided along the side flanges to accommodate the drive shaft 38. Fixed to the outer face of the end flange and the top of the housing 58 are transversely spaced hinge leaves 69 which are pivotally connected by pins 71 to clevis hinges 72 fixed to an angle member 73 fastened to the floor sheet 12a above the drive shaft 38.

Upon release of the pneumatic discharge cover 54, as explained above, so that the latter assumes a substantially vertical position as shown in FIG. 4, the pins 66 fixed to the protective housing 58 and riding in the slots 64 cause the housing 58 to be pivoted about the pivot pins 71 and spaced from the floor sheet 12b. To provide access to the door operating mechanism for cleaning and adjusting when necessary, the slots 64 are formed of sufficient length such that upon moving the cover 54 to the position shown in FIG. 5 the protective enclosure 58 is further lifted by way of the pins 66 engageable within the slots 64. To releasably retain the cover 54 and protective enclosure 58 in this position, the slots 64 terminate in detent openings 74 receiving the pins 64.

As heretofore described the cylindrical feed tubes 57 project and are fixed to the slope sheets 14 so as to be axially aligned with the cylindrical segment of the feed trough 56. Detachably covering the open ends of the feed tubes are cover assemblies 76 each including a cap 77 having a top recess 78 which is adapted to receive a thumb screw 79 carried by a bail 81 pivotally attached to the feed tubes 57 by means of pivot pins 82. In operation one or both of the feed tubes 57 may be uncovered and a suction tube of the pneumatic feed device not shown attached to one so that this feed tube serves as the material outlet. The other feed tube may be partially or completely uncovered to provide an air intake for controlling the rate of flow through the system. In the event it is desired to partially uncover the opening the more or less conventional perforate cover and rotatable disc construction may be incorporated into the cap structure 77. In this type of construction the top of the cap 77 is perforate and a perforate disc is turnably secured to the top. The perforate disc is arranged so that turning thereof may completely block the cover openings.

Assuming that the hopper 10 is loaded or filled with a pulverulent or granular material such as grain, plastic resin beads, flour, or the like, and it is desired to unload the same and the material is to be unloaded by a pneumatic discharge system, the components of the combination pneumatic and gravity discharge arrangement are in the position occupied during transit as shown in FIG. 3. In this position the gate 36 is closed over the opening with the leading or terminal edge thereof abutting the rim 27. The cover 54 including the feed trough 56 fixed thereto is held adjacent the gate 36 by means of the hand bolt 61 threadably engaging the lip 63. It is to be noted that the upper longitudinal edge of the trough 56 lies in close proximity to the outer face of the gate 36. To preclude tampering or inadvertent discharge of the material the hand bolt 61 is sealed against turning by means of a car seal 70. The end caps 77 covering the outlet end of the cylinder are also closed.

If the material is to be unloaded by way of a pneumatic discharge system, one of the caps 77 is removed and the usual suction hose attached thereto and the other cylinder may be retained covered or the cover or the cover assembly, if it incorporates an air intake arrangement previously described, may be adjusted to achieve the desired rate of material feed. Thereafter, the actuating shaft is turned by way of a wrench or the like so as to open the gate 36 a specified amount so that the material within the hopper is free to fall into the trough 56 wherein the suction applied by the pneumatic discharge system is operative to withdraw the material through the feed cylinder outlet 57. The gate 36 is adjusted to the extent required to achieve the desired rate of flow into the trough 56 commensurate with a maximum rate of discharge through the feed cylinder outlet 57. However, under no circumstances when the load is pneumatically unloaded will the leading or terminal edge 50 of the gate 36 be located so that the trough 56 does not have an air space above the level of the material deposit therein. Such an air space in the trough 56 is essential for the efficient unloading of the hopper.

Should the nature of the material or the lack of pneumatic discharging dictate that the material be gravity discharged the car seal 50 is broken and the hand bolt 61 is unscrewed from engagement with the lip 63 projecting from the trough 56 of the cover 54. This permits the cover 54 to fall under its own weight to the position shown in FIG. 4. The gate is adjusted to obtain the desired rate of flow through the opening 16 by way of turning of the shaft 38 which elevates the gate 36 by way of the gears 42 and 43 and screws 44 as heretofore explained.

What is claimed is:

1. In a hopper car for transporting pulverulent material and having a substantially V-shaped discharge section, an arrangement for selectively discharging said material pneumatically or by gravity comprising an opening formed along one of the sides of said V-shaped discharge section, a gate slidable on said one side for closing and opening said opening, a cover movably mounted on said one side over said opening and gate and including a trough overlying said gate for receiving material passing through said opening when said gate is opened, and conduit means on said housing aligned with said trough and adapted to be connected to a pneumatic discharge system for pneumatically unloading said material.

2. The invention as defined in claim 1 wherein said trough is formed as a segment of cylinder and is coaxially disposed relative to said conduit means.

3. The invention as defined in claim 2 wherein said cover is pivotally connected to said one side above said opening so as to be turnable between a position clear of said opening to a position overlying said opening in which latter position said trough is axially aligned with said conduit means.

4. The invention as defined in claim 1 wherein there is provided gate actuating means connected to said gate exteriorly of said housing for sliding said gate lengthwise over said opening.

5. The invention as defined in claim 4 wherein said gate actuating means comprises a gear drive means supported on said one side above said opening.

6. The invention as defined in claim 1 wherein said cover is pivotally connected to said one side above said opening so as to be pivotally movable between a position clear of said opening to a position over said opening in which latter position said trough is in communication with said conduit means, and wherein there is provided gate actuating means including gear drive means supported on said one side above said opening, said gear drive means being operative for sliding said gate over said opening.

7. The invention as defined in claim 6 wherein there is provided protective covering means over said gear drive means, said protective covering means being pivotally connected to said one side and operatively connected to said cover so that upon pivotal movement of said cover free of said opening said enclosure means is moved to provide access to said gear drive means.

8. In a hopper car for transporting pulverulent material and having a discharge section formed as a substantially V-shaped housing, an arrangement for selectively discharging said material pneumatically or by gravity comprising a substantially rectangular opening formed along one side of said housing, said opening having one edge defined by the nadir of said housing, a gate slidably mounted on said one housing side for movement toward and away from said nadir edge to selectively vary the size of said opening, a cover pivotally mounted on said one side and movable from a position overlying said gate and opening to a position clear thereof, a trough formed on said movable cover and arranged to lie adjacent said nadir when said cover is in said overlying position, and actuating means for said gate for selectively varying said opening and thereby controlling the rate of feed of said material into said trough.

References Cited in the file of this patent
UNITED STATES PATENTS

| | | |
|---|---|---|
| 2,926,962 | Dorey | Mar. 1, 1960 |
| 2,962,325 | Dorey | Nov. 29, 1960 |
| 3,048,449 | Allen | Aug. 7, 1962 |